(12) United States Patent
Borg et al.

(10) Patent No.: US 11,379,252 B1
(45) Date of Patent: Jul. 5, 2022

(54) SYSTEM AND METHOD FOR PROVIDING LAYOUTS FOR A REMOTE DESKTOP SESSION

(71) Applicant: Parallels International GmbH, Schaffhausen (CH)

(72) Inventors: Marco Borg, Sliema (MT); Nikolay Dobrovolskiy, Moscow (RU); Serguei M. Beloussov, Costa del Sol (SG)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 201 days.

(21) Appl. No.: 15/884,550

(22) Filed: Jan. 31, 2018

(51) Int. Cl.
| | |
|---|---|
| *G06F 9/451* | (2018.01) |
| *H04L 65/1069* | (2022.01) |
| *G06F 3/04847* | (2022.01) |
| *G06F 40/106* | (2020.01) |
| *H04L 67/01* | (2022.01) |

(52) U.S. Cl.
CPC .......... *G06F 9/452* (2018.02); *G06F 3/04847* (2013.01); *G06F 40/106* (2020.01); *H04L 65/1069* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 7,216,298 | B1 * | 5/2007 | Ballard | G06F 16/9577 715/760 |
| 7,389,417 | B1 * | 6/2008 | Steinglass | G06F 9/451 713/167 |
| 8,271,333 | B1 * | 9/2012 | Grigsby | G06Q 30/02 705/14.73 |
| 8,554,616 | B2 * | 10/2013 | Kumar | G06Q 30/02 705/14.4 |
| 9,081,746 | B1 * | 7/2015 | Helter | G06F 15/16 |
| 2002/0104096 | A1 * | 8/2002 | Cramer | H04N 7/17318 725/113 |
| 2003/0084401 | A1 * | 5/2003 | Abel | G06F 16/9535 715/205 |
| 2006/0053384 | A1 * | 3/2006 | La Fetra, Jr. | G06F 3/048 715/765 |
| 2006/0230331 | A1 * | 10/2006 | Abanami | G06Q 30/02 715/234 |
| 2007/0008186 | A1 * | 1/2007 | Michaels | B63B 49/00 340/945 |

(Continued)

*Primary Examiner* — Ryan Barrett
*Assistant Examiner* — Haimei Jiang
(74) *Attorney, Agent, or Firm* — Rosenberg, Klein & Lee

(57) ABSTRACT

Disclosed are systems and methods for providing layouts for a remote desktop session. According to one aspect, a method comprises receiving, at a remote application server, a request from a client device to initiate a remote desktop session, extracting configuration information regarding the client device from the request, retrieving, from a database, a layout that defines one or more remote applications and configurations for the one or more remote applications executing on the remote desktop session, initiating the remote desktop session with the client device, launching the one or more remote applications defined in the layout and configuring the one or more remote applications according to the configurations.

10 Claims, 10 Drawing Sheets

(56) References Cited

U.S. PATENT DOCUMENTS

| | | | |
|---|---|---|---|
| 2007/0079252 A1* | 4/2007 | Ramnani | G06F 9/451 715/781 |
| 2007/0100648 A1* | 5/2007 | Borquez | G06F 8/20 709/218 |
| 2007/0156524 A1* | 7/2007 | Grout | G06Q 30/00 705/14.73 |
| 2007/0161402 A1* | 7/2007 | Ng | H04L 67/06 455/554.2 |
| 2007/0220553 A1* | 9/2007 | Branam | G06Q 30/02 725/46 |
| 2008/0119173 A1* | 5/2008 | Nguyen | H04M 3/4285 455/414.1 |
| 2008/0126944 A1* | 5/2008 | Curtis | G06F 16/986 715/733 |
| 2008/0147811 A1* | 6/2008 | Schroeder | H04L 51/36 709/206 |
| 2008/0200161 A1* | 8/2008 | Morse | G06Q 30/02 455/418 |
| 2008/0281722 A1* | 11/2008 | Balasubramanian | G06Q 30/06 705/26.8 |
| 2009/0013347 A1* | 1/2009 | Ahanger | G06Q 30/02 725/36 |
| 2009/0048913 A1* | 2/2009 | Shenfield | G06Q 30/02 705/14.47 |
| 2009/0061764 A1* | 3/2009 | Lockhart | G06Q 30/0207 455/3.06 |
| 2009/0106663 A1* | 4/2009 | Pirie | G06Q 30/02 715/744 |
| 2009/0165041 A1* | 6/2009 | Penberthy | G06Q 30/0241 725/34 |
| 2009/0249359 A1* | 10/2009 | Gaunter | G06F 9/454 719/315 |
| 2009/0282359 A1* | 11/2009 | Saul | G06F 3/0481 715/784 |
| 2011/0202953 A1* | 8/2011 | Johnson | G06Q 30/02 725/35 |
| 2012/0084663 A1* | 4/2012 | Momchilov | G06F 3/1423 715/744 |
| 2013/0061131 A1* | 3/2013 | Zito | G06Q 30/02 715/234 |
| 2013/0111382 A1* | 5/2013 | Glaza | G06F 9/451 715/765 |
| 2013/0212499 A1* | 8/2013 | Mentchoukov | H04L 41/22 715/760 |
| 2013/0275892 A1* | 10/2013 | Li | G06F 3/0481 715/762 |
| 2014/0181702 A1* | 6/2014 | Suissa | G06F 3/0484 715/762 |
| 2014/0259718 A1* | 9/2014 | Mehra | A47G 1/205 33/562 |
| 2014/0263677 A1* | 9/2014 | Divringi | G06Q 30/02 235/494 |
| 2014/0304326 A1* | 10/2014 | Wesley | H04L 67/10 709/203 |
| 2015/0095854 A1* | 4/2015 | Olenick | G06F 3/0484 715/853 |
| 2015/0350360 A1* | 12/2015 | Wu | H04L 67/2823 709/203 |
| 2016/0239163 A1* | 8/2016 | Singal | G06F 3/0482 |
| 2016/0343351 A1* | 11/2016 | Chen | G06F 3/1454 |
| 2017/0105053 A1* | 4/2017 | Todd | H04N 21/816 |
| 2018/0232352 A1* | 8/2018 | Fulford | G09B 7/00 |

* cited by examiner

SYSTEM AND METHOD FOR PROVIDING LAYOUTS FOR A REMOTE DESKTOP SESSION

FIELD OF TECHNOLOGY

The present disclosure relates generally to the field of remote desktop management, and more specifically, to systems and methods for providing layouts for remote desktop sessions.

BACKGROUND

In virtual desktop environments, users often login to a remote desktop session and then launch particular applications that the users may use throughout the day. Additionally some users may position the windows associated with these applications in particular areas of the screen or screens the users are currently using.

Once the user has completed work for the day, the user may close out all open applications and log out of the remote desktop session, or shutdown the remote desktop entirely in order to free up used resources in the virtual environment. After shutting down the remote desktop, or disconnecting the session, the user loses the configuration of the desktop thus requiring the user to relaunch and reposition each application window according to user preference again. Repeatedly arranging and modifying the windows for remote applications is time consuming and wastes resources of the virtual desktop environment provider.

Additionally, when users transition between client devices such as a tablet computing device, to a laptop and to a desktop with multiple monitors, the users previously configured application windows will not be effectively displayed and the user will have to reconfigure the layout of the remote session for each different client device the user may use. This wastes user time and eats up processor cycles at the virtual desktop provider.

Therefore, the inventors have described herein methods and systems for adaptive layouts in remote applications.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

SUMMARY

Figure 1:
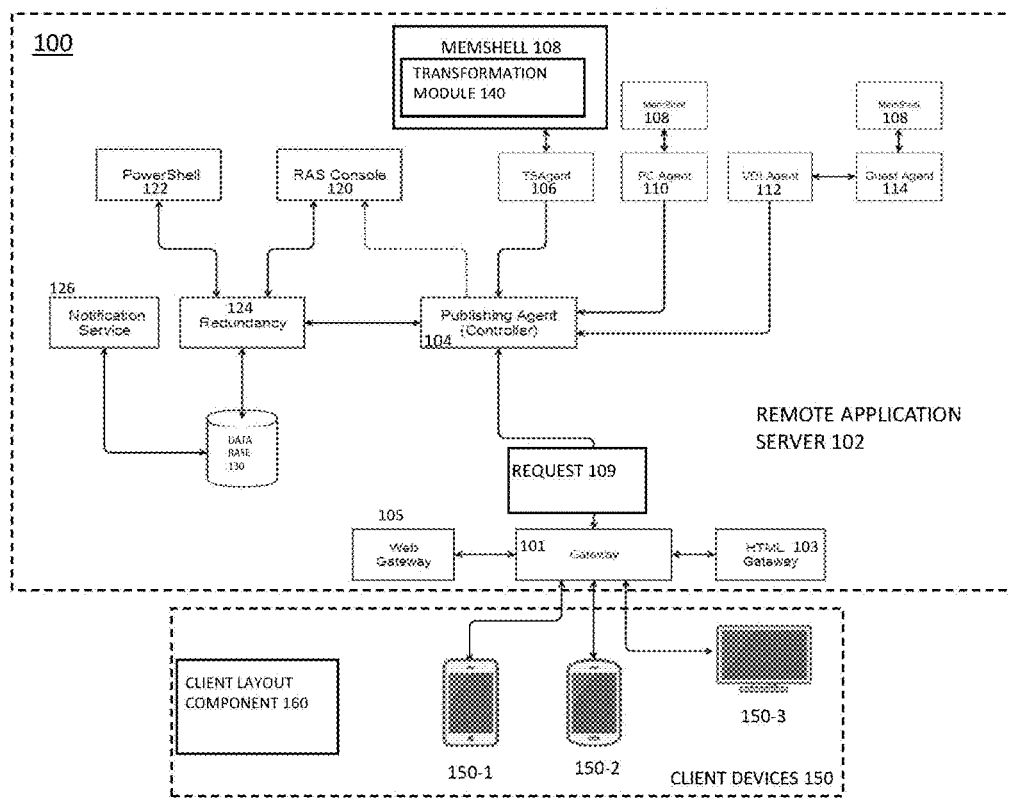
FIG. 1 is a block diagram illustrating a system for providing layouts for a remote desktop session according to an exemplary aspect.

Aspects of the present disclosure relate to systems and methods for providing layouts for remote desktop sessions. Exemplary aspects of the present disclosure mitigate wasted server resources on user configurations upon initiation of each remote desktop session, or launching of each remote application.

According to one exemplary aspect, a method is provided for providing layouts for a remote desktop. The method comprises receiving, at a remote application server, a request from a client device to initiate a remote desktop session, extracting configuration information regarding the client device from the request, retrieving, from a database, a layout that defines one or more remote applications and configurations for the one or more remote applications executing on the remote desktop session, initiating the remote desktop session with the client device, launching the one or more remote applications defined in the layout and configuring the one or more remote applications according to the configurations.

According to another exemplary aspect of the present disclosure, a system is provided for providing layouts for a remote desktop session. The system comprises a client device comprising a first processor coupled to a first memory, the client device initiating a request to a remote application server to establish a remote desktop session and the remote application server that receives, at a remote application server, a request from a client device to initiate a remote desktop session, extracts configuration information regarding the client device from the request, retrieves, from a database, a layout that defines one or more remote applications and configurations for the one or more remote applications executing on the remote desktop session, initiates the remote desktop session with the client device launching the one or more remote applications defined in the layout and configuring the one or more remote applications according to the configurations.

According to another exemplary aspect, a computer-readable medium is provided comprising computer-executable instructions that when executed, perform any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims

DETAILED DESCRIPTION

Exemplary aspects are described herein in the context of a system, method and computer program product for automating formation and execution of a backup strategy using machine learning. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Exemplary aspects of the present disclosure use deep learning algorithms to optimize and automate formation and execution of backup strategies for data endpoints.

FIG. 1 is a block diagram illustrating example operations of a system 100 according to an exemplary aspect.

The system 100 comprises a remote application server (or RAS) 102 coupled to a plurality of client devices 150-1, 150-2 and 150-3 (collectively, client devices 150) via a gateway 101. The RAS 120 further comprises a controller (or, publishing agent) 104, a TSAgent 106 a MemShell instance 108, a PC Agent 110, a VDI Agent 112, a guest agent 114, an administration console 120, a PowerShell 122, a redundancy module 124, a notification service 126 and a transformation module 140. In some aspects the RAS 102 also comprises database 130, however the database 130 may be hosted remotely from the RAS 102 in other aspects.

The client devices 150 transmits a request 109 to the remote application server 102 via gateway 101 to initiate a remote desktop session served by the RAS 102. The remote desktop session provides the ability for a user to use an operating system such as WINDOWS, OSX, or the like, as the user's desktop, or to use particular applications. In this manner, a user using an Apple® iPad®, a ChromeBook®, or the like, can access a Windows desktop or application, and a user using a ChromeBook® laptop can access a OSX® desktop, or the like.

The gateway 101 is, in some aspects, any gateway that provides access to a larger network such as the internet or a wide area network (WAN) such as an office intranet. The HTML Gateway 103 is also a client that can be used to launch applications in a web browser to connect to gateway 101, or using an installed native client at the client devices 150 to connect to gateway 101. The web gateway 105 is a portal which provides an application list that launches the native client at the client devices 150. The request 109 is received, via the gateway 101, at the RAS 102, and specifically by the controller 104 of the RAS 102. The controller 104 is a publishing agent which determines what applications are made available to clients 150 and who can use the applications. The terminal server agent (TS Agent) 106 provides virtual desktop resources which are consumed by the published applications. In some instances, the TS Agent 106 may be referred to as an remote desktop session host (RDSH). The PC agent 110 controls remote desktop connections from client devices 150, while the VDI Agent 112 is used by VDI hosts, which are servers on which Hypervisor® is running one or more virtual machines (e.g., guest virtual machines or VMs). Each VM runs an operating system called the quest operating system (OS). Thus each agent acts similarly to the TS Agent 106 for different types of hosts.

In some aspects of the disclosure, the client devices 150 request particular applications be launched in the remote desktop session. In other aspects, a layout received from the controller 104 determines which applications are published and accessible by each of the client devices 150. Each of the client devices 150 may be associated with a particular layout of the remote applications. Further, each of the client devices may contain a client layout component 160 which enables clients to request layout and remote application listings. In some aspects, the client layout component 160 can locally store layout information and details about remote desktop sessions (session detail objects) and request suggested layouts from the remote application server 102 based on application usage and application configuration information. In some aspects, the RAS 102 stores all of this information as well as suggestions for layouts and pushes the suggestions to the client devices 150.

A layout is a data structure that defines a set of published applications which are applications to be launched on initiation of a remote session from a client device associated with the layout. The layout also includes configurations for each of the set of applications that are to be launched. Layouts are created via the RAS console 120 and stored in the database 130 via the redundancy module 124. Once the client device selects a layout and initiates a remote desktop session, the session is populated with all of the remote applications associated with the layout. Each application in the session is also launched and configured as described in the layout so that the user experience is efficient and no processing cycles are wasted at the RAS 102 in handling constant modification of the remote application configurations to achieve a particular result. Instead, the particular configuration is recorded in a layout and instantly accessible by the user.

In one aspect of the disclosure, the configurations of the layout comprise the window position of each published application for a remote desktop session, the sizing of each window for each published application, spacing of each published application relative to other applications, whether the application is minimized, maximized, or visible at all upon initiation of the remote desktop session. Additionally the configurations may comprise affinity of each application to a particular display when the client device is coupled to multiple displays. In some aspects, the configurations may further comprise the ordering of the windows of each application, e.g., which application window appears on top of which other application window.

The configuration may further comprise, according to one aspect, instantiation data associated with the remote application. For example, the layout may configure MICROSOFT® WORD® to launch on initiation of the remote desktop session and create a new document with a particular template. Furthermore, the configuration of the layout can define whether the layout is locked or unlocked which determines whether a user using the layout can change the positioning of the remote application or resize the remote application, or locking may limit a user from launching other applications not part of the user's selected or permitted layout. The current disclosure does not limit the configurations to what is described herein and it is understood that any aspects of remote applications that are configurable in a local desktop environment can be defined in the configuration of the layout.

In one aspect of the disclosure, the RAS 102 pushes layouts stored in database 130, based on client device attributes, to the client devices 150 along with the published application listings via the controller 104 so that users of client devices 150 are aware of the various layouts available to the users. In some instances, the layout comprises an internal list of published applications associated and launched with that layout, while in other instances users can select a layout, while also selecting particular applications to launch during the users' remote desktop sessions.

The transformation module 140, a part of the MemShell 108 adapts selected layouts according to configuration information regarding client devices 150 such as display size and other features. For example, client device 150-1 is a tablet and thus the graphical windows associated with the remote applications make use of less visual space. The client device 150-2 is a smart-phone and thus may even have less visual space to display all of the applications, or a native client on the mobile device may only be able to display one application at a time, limiting layouts available on those devices. Thus, the administrator of the RAS 102 can create layouts that are ideal for those computing environments and layouts that adapt to changing from client device 150-1 to 150-2. In an example user flow, the user selects a particular layout at client 150-1 and then initiates a remote desktop session. Subsequently, the user wishes to use his or her smart phone 150-2 to access the remote desktop session, but with the same selected layout. The transformation module 140 modifies the layout by changing the configurations for each application based on new client device information such as resolution, screen size, pixel density and the like. The new layout is adapted accordingly, but to the user the adaptation appears to be a seamless operation where the user's applications are relatively all in the same location and sized properly according to the user's selected layout, yet all within a significantly smaller display footprint as compared to client 150-1.

Additionally, the transformation module 140 monitors and stores the application usages of the user at client devices 150 and suggests layouts from the database 130 that corresponds to the stored information. For example, if the transformation module 140 observes that a user at client device has initiated ten remote desktop sessions and during nine of those sessions has positioned two Microsoft word documents side by side on one screen, and one email application maximized on another screen, the transformation module 140 compares this application usage information with layouts stored in the database 130. If there are layouts with similar application configurations, then the transformation module 140 will add these layouts to a list of suggested layouts. The next time the user initiates a remote desktop session with RAS 102, the RAS 102 will display the suggested layouts from the transformation module 140.

Figure 2:
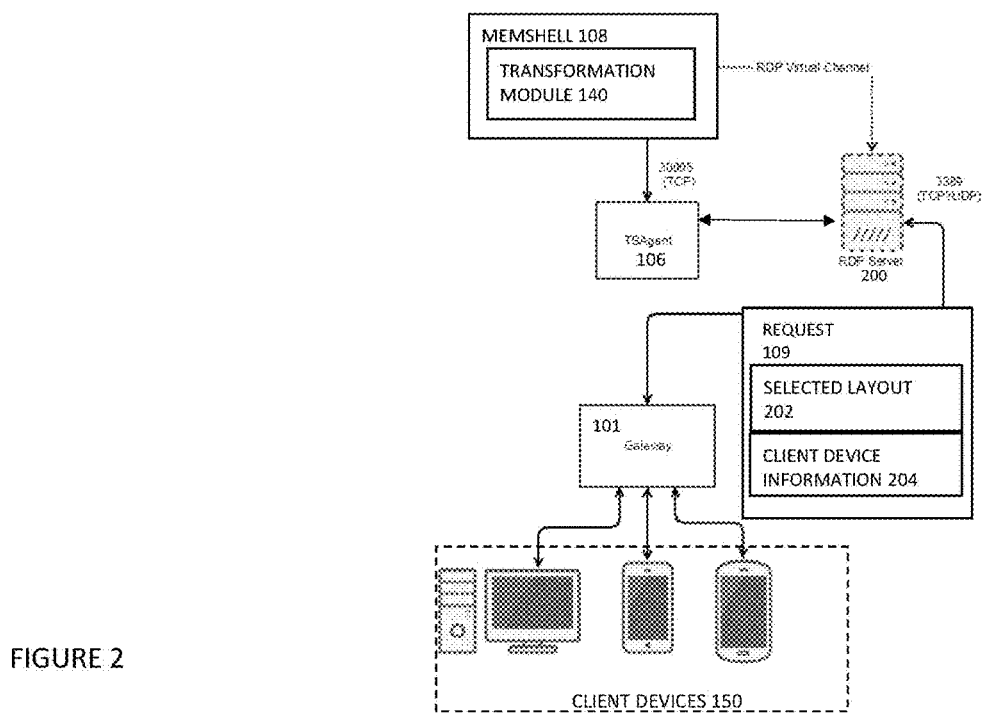
FIG. 2 is a block diagram illustrating the process of generated, transforming and providing layouts to client devices according to an exemplary aspect.

As shown in FIG. 2, when the user chooses to launch a selected layout 202, similar to launching an application, the client device (e.g., client 150-3) communicates the request 109 to the RAS 102 which internally routes the request 109 to an RDP server 200. In some instances, the RDP server 200 is configured to accept remote desktop session requests such as request 109 via TCP or UDP at port 3389, though other ports can be used. The request 109, in some aspects of the disclosure, comprises information regarding the type of remote desktop session the user wishes to initiate along with client device information 204. The client device information 204 may comprise resolution and size information regarding the display(s) associated with the client, processor speed, RAM, storage space, and any other special parameters or functionality available at the client.

Via a virtual channel, the RDP server 200 passes on the request 109 (which includes the selected layout 202 and the client device information 204) to the Memshell component (or simply Memshell) 108. Memshell 108 performs the majority of processing and calculations in applying the configurations defined in the selected layout 202 to the published remote applications defined in the layout 202 based on the client device information 204. The TS Agent 106 passes configuration settings to Memshell 108 through shared memory. The selected layout 202 is identified via an identifier (ID) which links to the layout's settings. The MemShell 108 requests the TS Agent 106 to retrieve the configuration settings of the selected layout 202 from the database 130 via the publishing agent 104. The TS Agent 106 receives the configuration settings associated with selected layout 202 from the publishing agent 104 and forwards this information to the MemShell 108 The TS Agent 106 then launches all applications and positions the applications according to the configuration identified by the selected layout 202. The desktop session is initiated with the client devices 150 via the RDP server 200.

Figure 3:
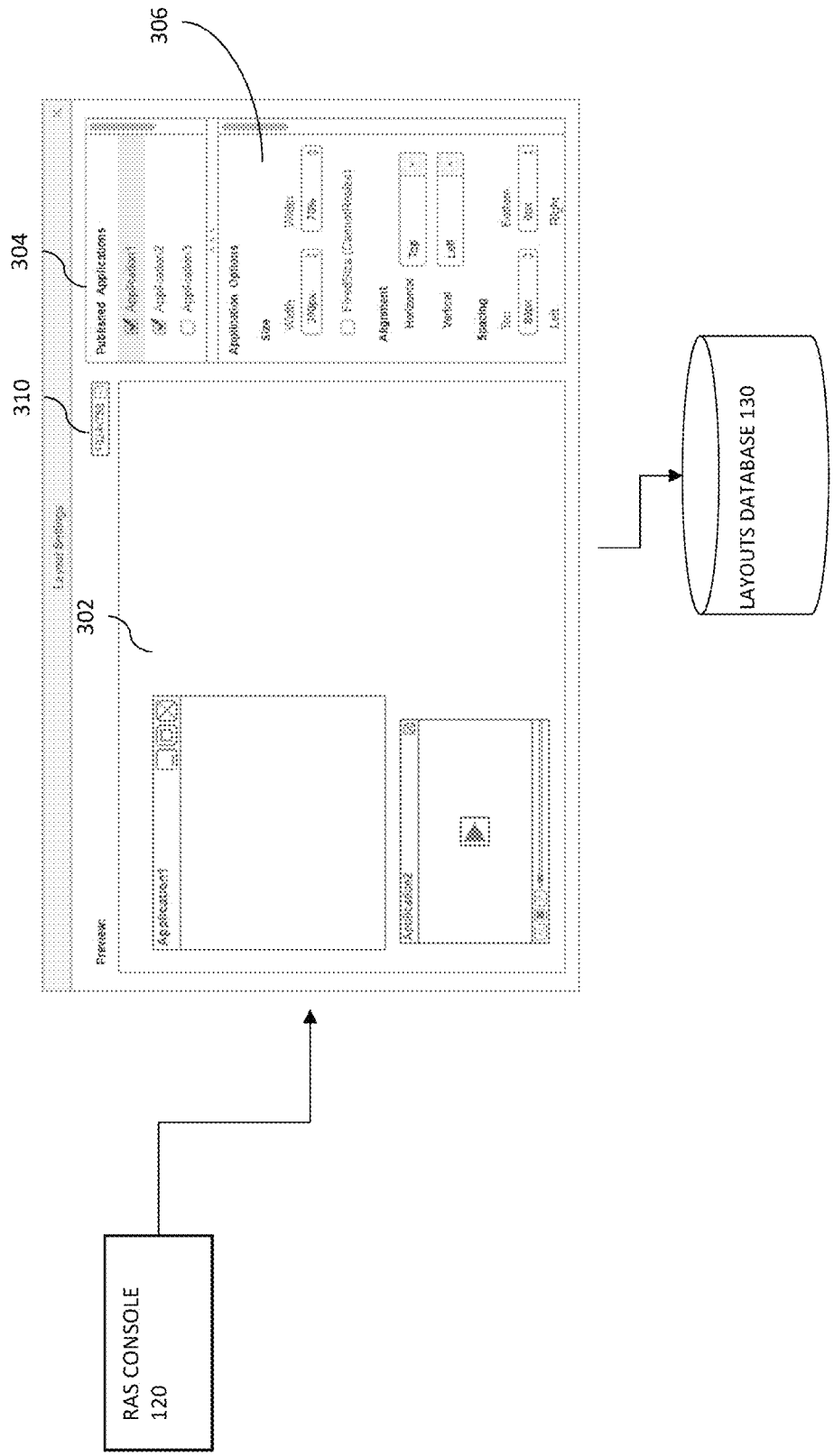
FIG. 3 is a block diagram illustrating example operations of creating and saving layouts through an administrative console according to an exemplary aspect.

According to one aspect of the disclosure, an administrator of the RAS 102 may define a layout via a graphical user interface as shown in FIG. 3 available via the RAS console 120. In another aspect of the disclosure, the RAS 102 can predict and create new layouts based on attributes of the client devices 150 and user actions at the client devices 150 and automatically save these layouts in the database 130 via the redundancy module 124. The redundancy module 124 provides a data layer to persist data to the database 130. According to one aspect, the redundancy module 124 translates commands passed in by various components of system 100 to commands that can be executed at the database level (e.g., from XML to SQL, or the like). Additionally, the redundancy module 124 synchronizes settings information across the system 100.

In FIG. 3, the administrator has positioned and sized Application 1 and Application 2 in the layout workspace 302. In the published applications portions 304, the administrator has defined Application 1 and Application 2 to be "Published" so that the applications will be launched when this particular layout is selected by a user. In another aspect, the user can select published applications from a list provided by the RAS 102 at a client device.

According to one aspect, the Published Applications portion 304 is a list of the available published applications which are published from RAS 102. When a user activates a native client at one of the client devices 150, the user is presented with an application list that is available to that particular user. Applications that are published from the RAS 102 are listed in the published applications portion 304. Applications have multiple options and filtering, for instance certain applications may be hidden from certain groups, users, IP Addresses, Gateways or the like (though not limited thereto) via the application options portion 306. In one aspect, another option for applications may be that the applications are only available in particular layouts.

The administrator can modify configurations of each application by selecting the application in the published applications portion 304. After selection in portion 304, the Application options portion 306 is populated with the configuration options available for each particular application. Shown in portion 306 are size configurations, fixed or modifiable flags, vertical and horizontal alignment of the application and top, bottom, left and right spacing between other applications. While other configuration options are not shown, some applications may have special options such as a particular templates to load after launching the application and other special parameters that may be set such as order of the application dictating which application appears above others when the application windows overlap. Further configuration options include, in some aspects, affinity of the application to a display of the client device, visibility of an application and command parameters passed to an application before launching.

Size configurations control the size of each application window and is configurable on a per-application basis. The alignment option allows an administrator to select where in a desktop window the application appears after launch. For example, Application 1 in FIG. 3 is selected to appear at the top left of the screen. Alternatively, the alignment can be specified in pixel-perfect format relative to a given resolution 310. In another aspect, the administrator can drag and move the position of the applications around the workspace 302 and the change is reflected in the application options portion 306. If snap alignments such as "top/bottom/left/right" are selected, the windows snap to the given position as the layout editor repositions the application window.

The spacing is, in some aspects, specified using pixel measurements or percentages relative to the selected resolution 310. In FIG. 3, Application 1 has a top spacing of "80 px" and a bottom spacing "0 px". Accordingly, the window for Application 1 appears with 80 pixels of extra spacing above and has no extra spacing below the window, given the remote desktop session automatically configures some default spacing in some aspects of the disclosure. According to other aspects of the disclosure, Application 2 may be configured with spacing of its own affecting the view of the entire layout.

Once the administrator has completed editing or creating the layout through the RAS console 120, the layout is saved to the layouts database 130 as a record containing all of the configuration details. In some instances, the layout is stored as a binary object for easy retrieval from the database while in other aspects, the layout is stored as textual configuration data. In yet other aspects, the layout is stored as a combination of binary and textual data in the layouts database 130.

Figure 4:
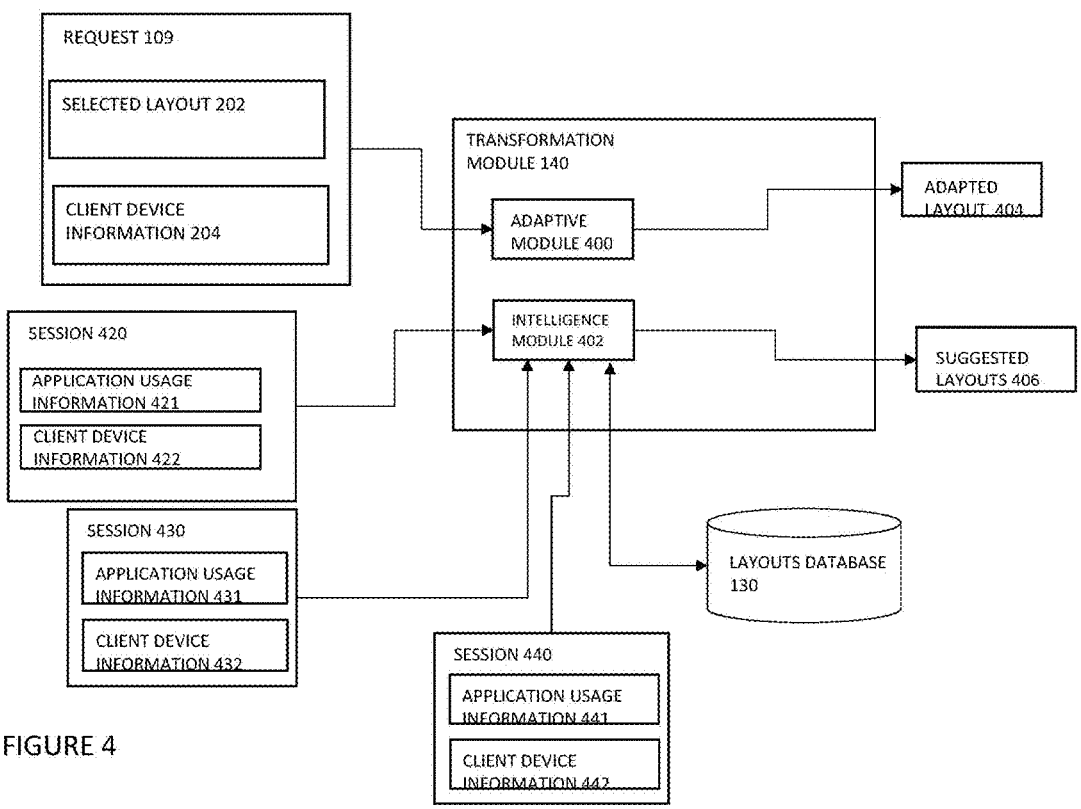
FIG. 4 is a block diagram of a transformation module for adapting layouts and generating intelligent layouts for client devices according to an exemplary aspect.

FIG. 4 is an illustration of the transformation module 140 according to one aspect of the disclosure. The transformation module 140 comprises an adaptive module 400 and an intelligence module 402.

According to one aspect of the disclosure, the transformation module 140 received a selected layout 202 and a request 109 containing client device information 204. The adaptive module 400 determines whether the client device information 204 has changed from client device information initiated by the same user in previous remote desktop sessions at RAS 102. If the client device information has changed, the difference is calculated by the adaptive module 400 and the changes are applied to the selected layout 202 to generate an adapted layout 404. The adapted layout 404 is then applied to the remote desktop session in a similar fashion as described with respect to FIG. 2. In another aspect, the adaptive module 400 retrieves the selected layout 202 configuration settings from the database 130 through the redundancy module 124, as described above. The adaptive module 400 then determines whether the client device information 204 has changed or whether layout settings were updated as well and then adapt accordingly.

Figure 5:
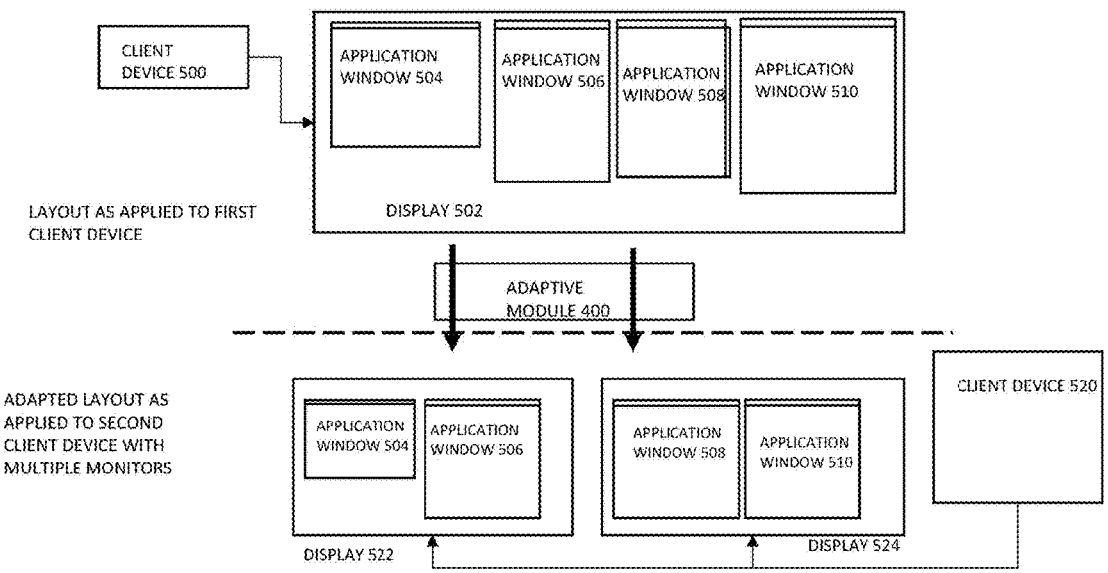
FIG. 5 is an illustration of adapting layouts using the transformation module according to an exemplary aspect.

An example of such an adaptive layout is shown in FIG. 5. The selected layout by a user of client device 500 is initially composed by MemShell 108. The client device is coupled to a single display 502 with application window 504, 506, 508 and 510 all visible in a single display. At a future point in time, the user moves to a different location and begins using a new client device 520. The new client device 520 is coupled to two displays, display 522 and display 524. The adaptive module 400 determines this hardware change between the client device 500 and client device 520 and adapts the selected layout accordingly. The layout can be configured with rules on how to adapt the layout. These rules comprise, in one aspect: allowing or disallowing multiple monitors (e.g., even if an extra monitor is detected, the layout is not modified and only shown on one monitor), restricting applications to particular monitors, locking window size of an application after launch, or disallowing changing the position of one application in a layout during adaptation, but allowing changing the position of another application, in addition to any initial rules described in the layout (e.g., how the initial layout is configured). Other rules may include launching applications with a particular templates.

In this aspect shown in FIG. 5, the selected layout is configured by the administrator to split the layout in half. In other configurations, the layout can take into account the relative sizes of the displays and distribute the application windows accordingly, resize or reposition the application windows accordingly. The adaptive module 400 repositions application windows 504 and 506 into the first display 522. The adaptive module 400 further resizes the application windows to occupy a percentage of the screen—such actions can be configured in the layout definition. The adaptive module 400 repositions application windows 508 and 510 to the second display 524 and also resizes the application windows.

The transformation module 140 of FIG. 4 also comprises an intelligence module 402 which monitors various remote desktop sessions initiated by a user over a period of time, for example, session 420, session 430 and session 440 comprising application usage information, respectively 421, 431 and 441. Each of the sessions also comprise, respectively, client device information 422, 432 and 442. The application usage information (421, 431, 441) each contain data indicating which applications were used during the session, the number of times the applications were launched, the application's positioning and size and other configuration information regarding the session and application. The intelligence module 402 determines whether there is a pattern of usage over a period of time, the time being configurable by an administrator of the RAS 102 via RAS console 120. The pattern is then queried against layouts in the database 130 by the intelligence module 402 in order to build a list of suggested layouts 406. The suggested layouts 406 comprise layouts whose pattern matches the usage patterns of the user as defined in the application usage information 421, 431 and 441. Similarly, an administrator can define the period of time, or the number of sessions upon which to invoke the generation of the suggested layouts 406 by the intelligence module 402.

Figure 6:
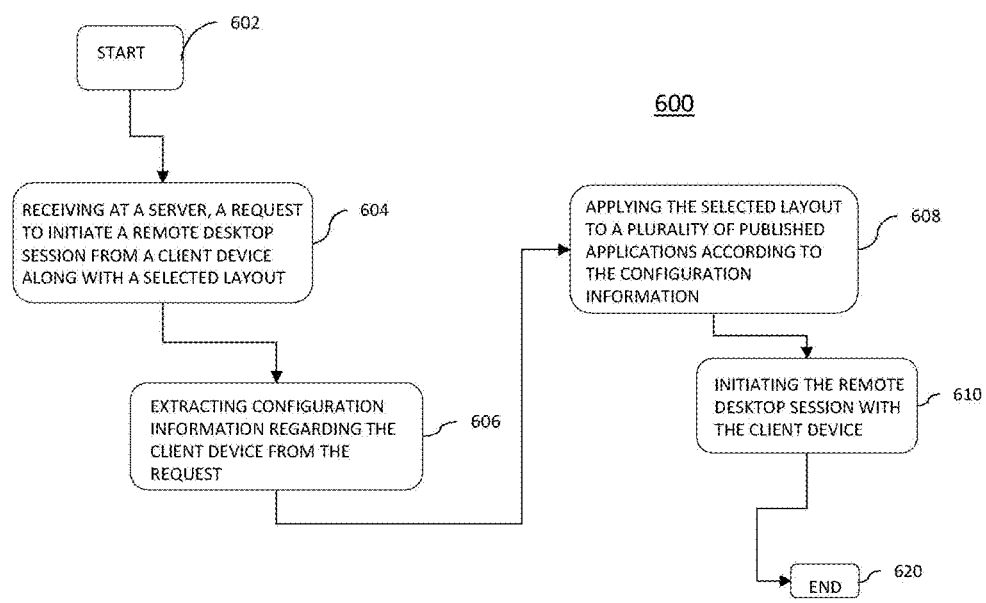
FIG. 6 shows a flowchart for a method for providing layouts for a remote desktop session according to an exemplary aspect.

FIG. 6 is a flow diagram of a method 600 for providing layouts for a remote desktop session in accordance with aspects of the present disclosure. The RAS 102 is an exemplary implementation of the method 600, as executed by a computer system such as described in FIG. 9.

The method 600 begins at step 602 and proceeds to step 604. At step 604, the RAS 102 receives a request to initiate a remote desktop session from a client device. The request includes a selected layout along with configuration information regarding the client device.

At step 606, the RAS 102 extracts the configuration information from the request to identify the client device properties such as those described with respect to FIGS. 1-4. The configuration information may further comprise, according to one aspect, number of monitors, available resolutions of the monitor, current resolution at the client device and any relevant hardware and software configuration information that can be taken into account when suggesting or adapting layouts.

The method 600 then proceeds to step 608, where the MemShell 108 applies the selected layout to a plurality of published applications described in the selected layout, according to the configuration information provided by TS Agent 106. At step 610, the RAS 102 initiates the remote desktop session with the client device. The method terminates at step 620.

Figure 7:
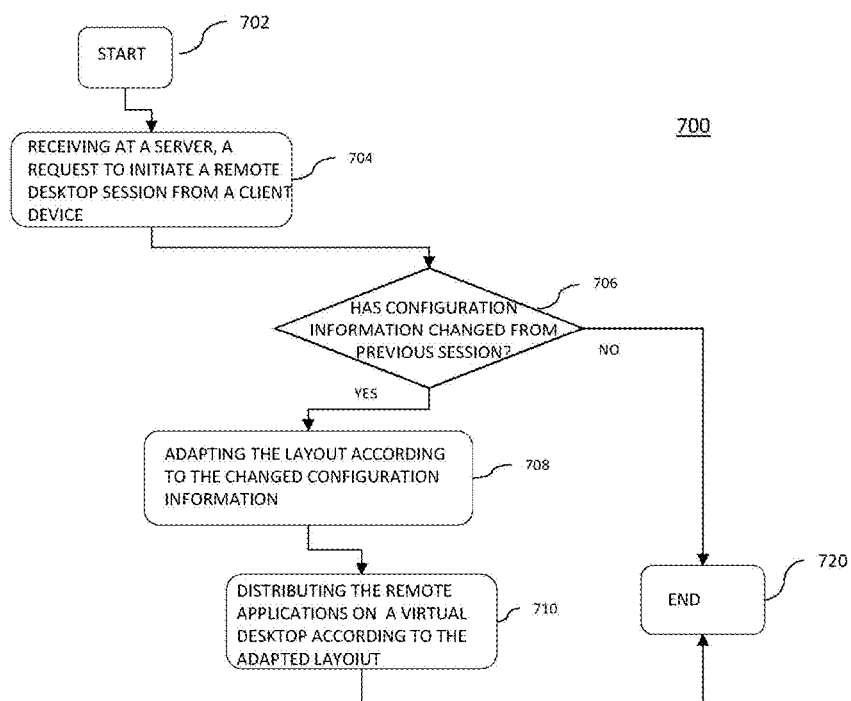
FIG. 7 shows a flowchart for a method for adapting layouts for a remote desktop session according to an exemplary aspect.

FIG. 7 is a flow diagram of a method 700 for adapting layouts for a remote desktop session in accordance with aspects of the present disclosure. The RAS 102 and the transformation module 140 are exemplary implementations of the method 700, as executed by a computer system such as described in FIG. 9.

The method 700 begins at step 702 and proceeds to step 704. At step 704, the RAS 102 received a request to initiate a remote desktop session from a client device such as one of the client devices 150.

At step 706, the transformation module 140 invokes the adaptive module 400 of FIG. 4 to determine whether configuration information of a client device has changed from previous sessions. In some instances the client device may not have changed, but the configuration of the client device has changed. In other instances, the same user is using a new client device, selecting the same layout the user previously chose, and initiating a remote desktop session via the new client device. When the adaptive module determines that there is no change in configuration or client device, the method terminates at step 720.

Alternatively, if the adaptive module 400 detects a configuration change by comparing the previous client configuration information with current client configuration information, the method 700 proceeds to step 708. At step 708, the adaptive module 400 adapts the layout that the user selected according to the changed configuration information as described with respect to FIGS. 1 and 4. For example, the display affinities of remote applications are adapted, sizes and positions of application windows are adapted according to resolution, and order of windows is adapted. In other instances, depending on the change in configuration information, some applications may be visible while others are set to non-visible on initiation of the remote desktop session. At step 710, the remote applications are distributed on a virtual desktop of the remote desktop session according to the adapted layout. The method terminates at step 720.

Figure 8A:
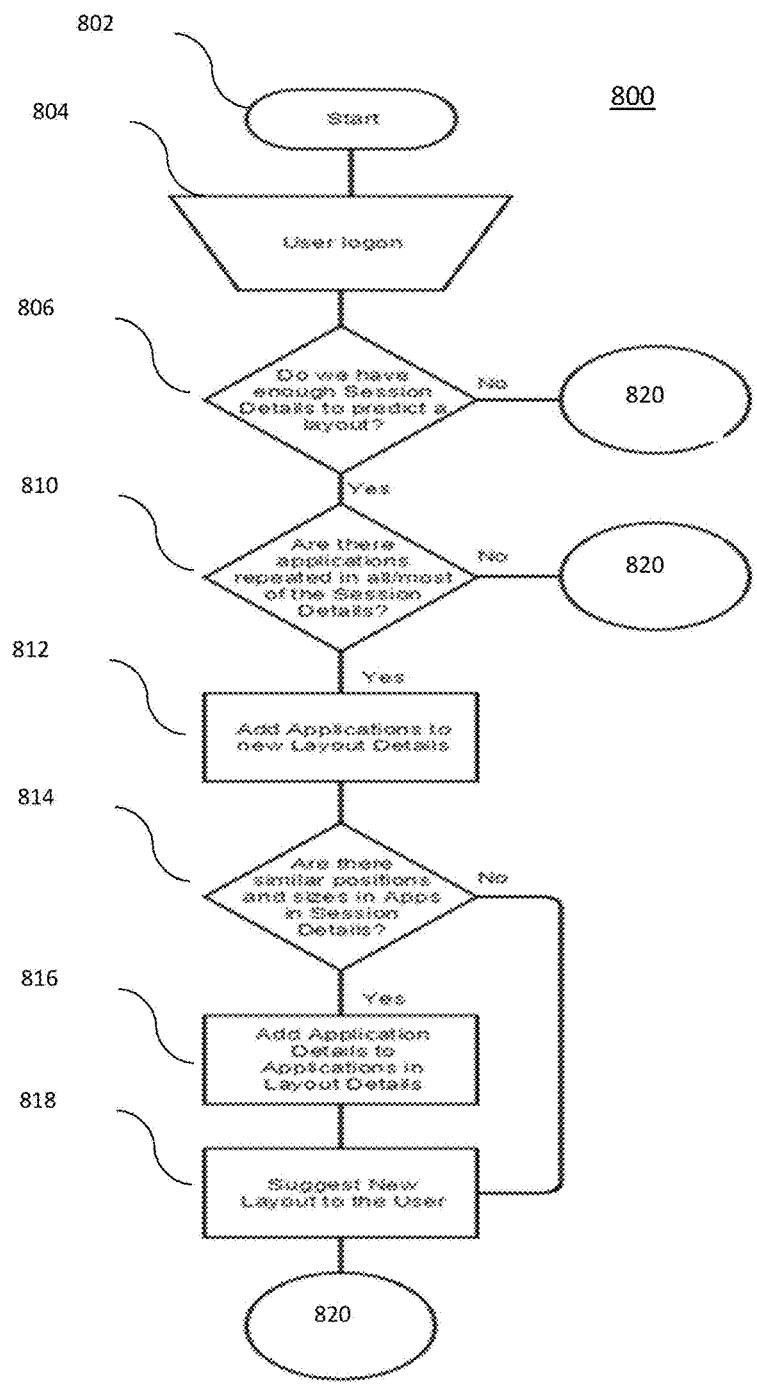
FIGS. 8A-8B show a flowchart for a method for suggesting new layouts for a remote desktop session according to an exemplary aspect.
Figure 8B:
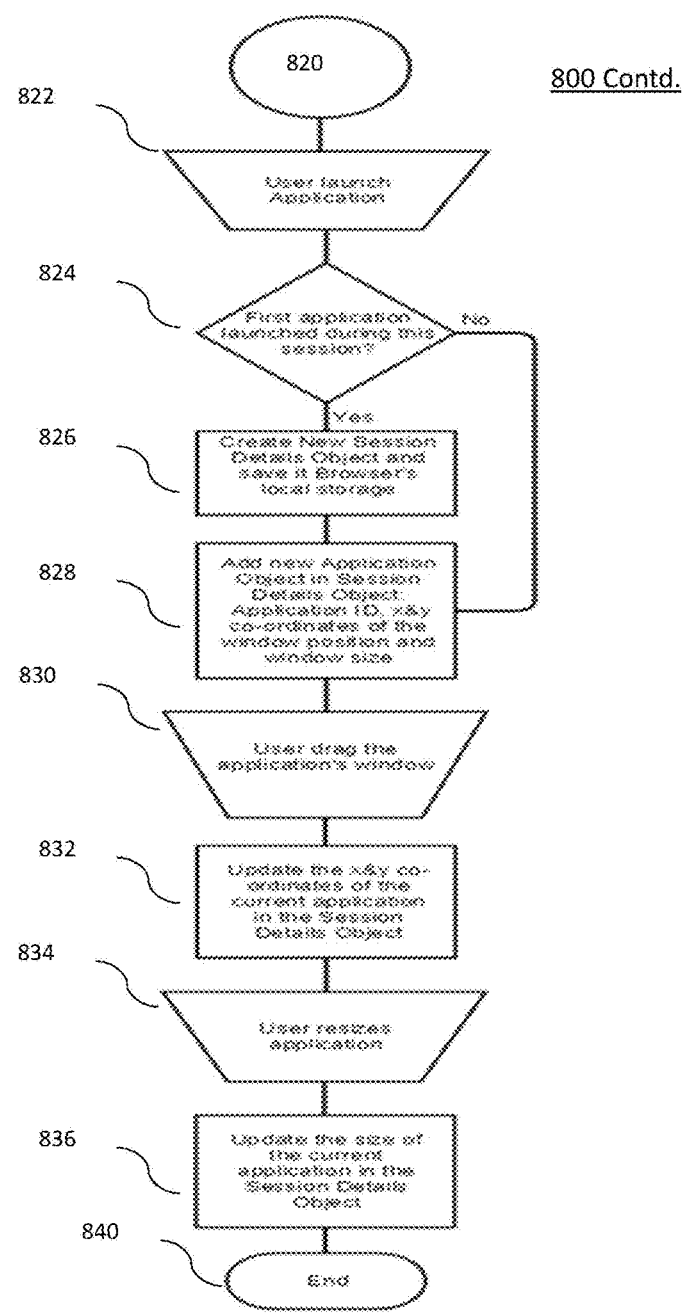

FIGS. 8A-8B show a flow diagram for a method 800 for providing intelligent layouts for a remote desktop session in accordance with aspects of the present disclosure. The transformation module 140 are exemplary implementations of the method 800, as executed by a computer system such as described in FIG. 9.

The method 800 begins at step 802 in FIG. 8A and proceeds to step 804. At step 804, the RAS 102 received a user-logon request (i.e., a request to initiate a remote desktop session) from a client device such as one of the client devices 150.

At step 806, the transformation module 140 invokes the intelligence module 402 to determine if there are enough session details to predict or suggest a layout. If there are not enough details then the method proceeds to step 820. If there are enough details, the method proceeds to step 810. In one aspect, relevant details include application usage, size and position and number of sessions. For example, one or two sessions are not enough to predicate a pattern that can be used to suggest layout. On other hand, more than 5 sessions may be enough to predict a pattern and suggest a layout. The administrator of the RAS 102 can manually set the number of sessions and other values that are needed to suggest layouts. At step 810, the intelligence module 402 determines where there are applications repeated in all or most of the session details of previously monitored and stored sessions such as sessions 420, 430 and 440 shown in FIG. 4. If there are not enough details, the method moves to step 820. If there are enough details the method moves to step 812, where the intelligence module 402 adds the repeated applications to a new layout as published applications.

The method proceeds to determine, at step 814, whether there are similar positions and sizes in the applications that the user uses across the sessions, e.g., sessions 420, 430 and 440. If there are similarities, then the method proceeds to step 816 where the details (or configuration information) is added to the new layout. The method then proceeds to step 818 where the new layout is suggested to the user. At step 814 if no similarities in application configuration information is detected by the intelligence module 402, the method skips step 816 and proceeds to step 818 to suggesting the new layout.

The method subsequently moves to step 820 in FIG. 8B and 822 where a user launches an application in the remote desktop session via input information received at the RAS 102 from the client device.

At step 824, if the intelligence module 402 determines that this is the first application launched during this session, the method creates a new session details object and saves the session details object to the RAS 102, though in some aspects the session detail object is saved in the client's local storage, or in both the RAS 102 and the client's local storage. In one aspect, the session details object is saved in a Browser's local storage via the client layout component 160, wherein the Browser is the browser that the user has used to logon to the desktop session. If the intelligence module 402 determines that this is not the first application launched, the method skips step 826 and proceeds to step 828 where a new application object is added in the session details (e.g., a new object in session 420, 430 and 440) that defines application configuration information such as the application identifier, window position of the application and window size.

At steps 830, the RAS 102 detects that the user has repositioned or dragged the application window via input from the client device and then updates the positioning in the session details object at step 834. At steps 834, the RAS 102 detects that the user has resized the application window via input from the client device and then updates the size of the window in the session details object at step 836. According to one aspect, the session detail object is updated with the latest user preferences so at next launch, applications information such as size, position and the like can be reconfigured based on what is stored in the user preferences. The method terminates at step 840.

Figure 9:
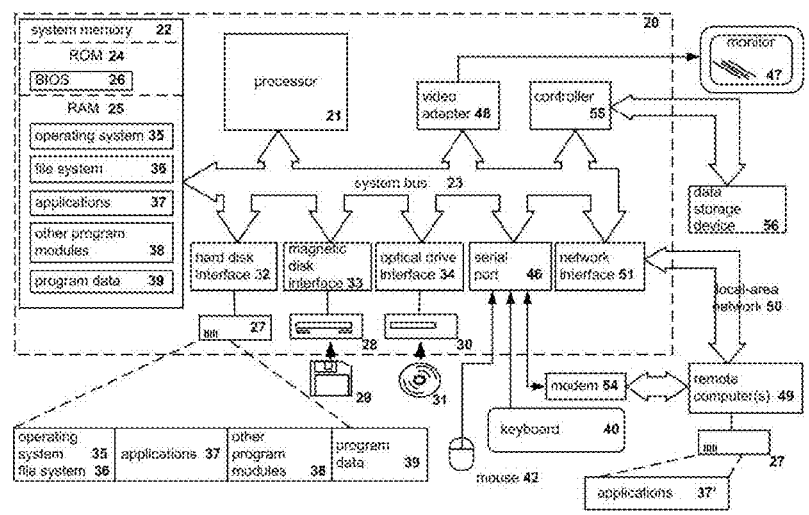
FIG. 9 is a block diagram of a general-purpose computer system on which the disclosed system and method can be implemented according to an exemplary aspect.

FIG. 9 is a block diagram illustrating a general-purpose computer system 20 on which aspects of systems and methods for providing layouts for remote desktop sessions may be implemented in accordance with an exemplary aspect. It should be noted that the computer system 20 can correspond to the system 100, each of the client devices 150, the RAS 102, and/or individual components of the RAS 102, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for providing layouts for a remote desktop session comprising: receiving, at a remote application server, a request from a client device to initiate the remote desktop session; extracting configuration information regarding the client device from the request; retrieving, from a database, a layout that defines one or more remote applications and configurations for the one or more remote applications to be executed during the remote desktop session, wherein the configurations from the layout retrieved from the database comprise positioning and ordering of one or more application windows of the one or more remote applications in a remote desktop session user interface (UI) provided during the remote desktop sessions monitoring, by the remote application server, attributes of remote applications launched by a user of the client device; and transmitting, to the client device, one or more suggested layouts based upon the attributes by comparing the attributes to attributes of existing layouts defined in the database; wherein the configurations for the remote applications comprise at least sizing of an application in the remote desktop session UI, alignment of the one or more remote applications, spacing between other applications in the remote desktop session, whether the one or more remote applications are locked in configuration, affinity to a display of the client device, and visibility of the one or more remote applications; and the ordering of the one or more application windows indicates which of the one or more application windows is to appear on top of another of the one or more application windows when the one or more application windows overlap, wherein the configurations further comprise whether the one or more remote applications are fixed in configuration and affinity to a display of the client device of the one or more remote applications; initiating the remote desktop session with the client device; launching the one or more remote applications defined in the layout; and configuring the one or more remote applications according to the configurations.

2. The method of claim 1, wherein the configurations for the one or more remote applications further comprise at least sizing of an application in the remote desktop session UI and alignment of the one or more remote applications.

3. The method of claim 2, further comprising: receiving, at the remote application server, a second request from a second client device to resume the remote desktop session; and adapting the layout to a hardware configuration of the second client device.

4. The method of claim 3, wherein adapting the layout further comprises: calculating percentages of the sizing of a second remote application defined in the layout according to a previous resolution; and applying the percentages to the sizing of the second remote application according to the hardware configuration of the second client device.

5. The method of claim 1, further comprising: determining whether a pattern of the attributes exists over a period of time, prior to transmitting the one or more suggested layouts.

6. The method of claim 1, wherein the attributes comprise at least one of: frequency of launching the remote applications, frequency of use of the remote applications, configurations of the remote applications defined by the user, or affinities of each of the remote applications to displays of the client device.

7. The method of claim 1, further comprising: providing, from the remote application server, a graphical user interface used to define or modify a layout; receiving a selection of one or more remote applications as published applications that launch when the layout is selected and the remote desktop session is initiated; receiving a configuration of the published applications; receiving, at the remote application server, a request to save the layout; and saving the layout in the database.

8. The method of claim 7, further comprising: receiving, at the remote application server, a second request to assign the layout to one or more users; and saving an assignment of the one or more users to the layout in the database.

9. The method of claim 7, further comprising: receiving, at the remote application server, a second request to assign the layout to one or more groups of users; and saving an assignment of the one or more groups of users to the layout in the database.

10. A method for providing layouts for a remote desktop session comprising: receiving, at a remote application server, a request from a client device to initiate the remote desktop session; extracting configuration information regarding the client device from the request; retrieving, from a database, a layout that defines one or more remote applications and configurations for the one or more remote applications to be executed during the remote desktop session, wherein the configurations from the layout retrieved from the database comprise at least visual spacing relative to other applications in a remote desktop session user interface (UI) provided during the remote desktop session and positioning of a remote application in the remote desktop session UI; initiating the remote desktop session with the client device; launching the one or more remote applications defined in the layout; configuring the one or more remote applications according to the configurations; monitoring, by the remote application server, attributes of remote applications launched by a user of the client device; and transmitting, to the client device, one or more suggested layouts based upon the attributes by comparing the attributes to attributes of existing layouts defined in the database; wherein the configurations for the remote applications comprise at least sizing of an application in the remote desktop session UI, alignment of the one or more remote applications, spacing between other applications in the remote desktop session, whether the one or more remote applications are locked in configuration, affinity to a display of the client device, and visibility of the one or more remote applications.

* * * * *